FIG. 4

Feb. 3, 1970 W. F. WHITE 3,492,713
APPARATUS AND METHOD FOR FORMING AND POSITIONING
Filed Feb. 2, 1968 7 Sheets-Sheet 3

United States Patent Office 3,492,713
Patented Feb. 3, 1970

3,492,713
APPARATUS AND METHOD FOR FORMING
AND POSITIONING
William F. White, Williston, Vt., assignor to International
Business Machines Corporation, Armonk, N.Y., a corporation of New York
Filed Feb. 2, 1968, Ser. No. 702,625
Int. Cl. B23p 19/04
U.S. Cl. 29—203                                          8 Claims

ABSTRACT OF THE DISCLOSURE

Apparatus for moving wire longitudinally a precisely controlled amount and preventing buckling and backlash, said apparatus being particularly suited for use in an apparatus for forming and positioning strapping elements on device substrates.

CROSS REFERENCES TO RELATED APPLICATIONS

Copending application of common assignee Ser. No. 589,645, filed Oct. 26, 1966, entitled "Apparatus and Method for Forming and Positioning," inventors Kendall Clark et al.

BACKGROUND OF THE INVENTION

Field of the invention

This invention relates to feeding wire against a stop, and to forming and positioning of wire elements, more particularly to automatic apparatus for forming generally L-shaped strapping elements for microminiaturized circuit devices, and precisely positioning the strapping elements on device substrates.

Description of the prior art

The trend in modern electronic technology is toward very small and compact electronic circuitry modular units. One particular form of technology is termed the hybrid technique in which a very small substrate normally forms the base for supporting conductive lands, individual semiconductor chips fused to the land, printed resistors, inductances, etc. The projection of such modular units is desirably automated since manual sorting, testing, and assembly of the very small components is time consuming, tedious and expensive.

In the production of printed circuits in general, and particularly in hybrid technology, it is frequently necessary to form a connection between two spaced conductor strips or land which are positioned on different levels and/or separated by a third land which must remain insulated from the first mentioned lands. This technique involves at least two separate steps which require considerable time, effort, and equipment to carry out, particularly if the circuit patterns vary frequently. Another method involves the forming of L-shaped elements and manually positioning them in the desired locations. This manual sorting and positioning requires considerable time and effort, is subject to human error and is generally not compatible with automated production lines fabricating module units or other printed circuit devices.

Throughout this specification, wire is to include the material from which the strap element is made, and may be of any cross sectional shape, rectangular being the most common.

The known devices for shaping and assembling wire elements, as for example, the shaping and welding of electronic tube components, transistor terminals, etc. are not capable of forming and precisely positioning strapping elements on printed electronic circuit devices. These elements are normally very small in size. The sorting and picking up of such elements for positioning is very difficult to automate if such are made in advance of assembly. The only apparent practical approach to the automation of making strapping elements on a printed circuit device appears to be first forming said elements and then immediately positioning them with the same apparatus used in the forming. The known devices are not capable of firmly holding a very small and fragile strapping element, and subsequently releasing it when it is in position. Moreover, other problems are presented in strap element installation, such as how to seat the element on the land with a pressure that is uniform and firm, but not too firm, how to facilitate the setting up of the apparatus to relocate the strap elements for different circuit patterns, how to facilitate the apparatus for setting the strap elements at different angular locations relative to the substrate, etc.

A major advance in the development of automated bridging devices is taught by copending application Ser. No. 589,645. The apparatus there disclosed first forms the generally U-shaped bridge elements from a length of wire, and then, without releasing the resultant formed bridge, positions it on the substrate with a uniform firm pressure. The said apparatus also provides means which enable the bridge element to be located on the substrate in any of a number of alternative angular relationships.

However, significant problems are encountered in adapting the said bridging device for forming and positioning strapping elements. The apparatus of the said copending application uses a ratchet and pawl mechanism to feed the wire into the stop. This type of feed mechanism is only accurate to within one tooth of the ratchet wheel. The wire is fed up to a stop and the rubber wheel overrides the remainder of the stroke. A significant problem in this approach is that when one desires to use strap material or wire that is significantly less thick, the wire will not stand the amount of overriding that the wire feed mechanism creates without bending.

Also, in the apparatus of the said copending application the transfer element and associated elements mounted on the frame may be rotated and set to a number of predetermined angular positions, allowing the bridge element to be located on the substrate in any of a number of alternate angular relationships. However, an angular position which differs from one of those predetermined angular positions is not possible.

The apparatus of the said copending application does not provide means for dimpling the wire prior to its being formed and positioned on a substrate, resulting in less secure and accurate positioning over the substrate balls than is required for strap elements.

SUMMARY OF THE INVENTION

It is therefore an object of this invention to provide an apparatus for moving very fine wire longitudinally an infinitesimal small adjustable distance.

Another object is to provide an apparatus for longitudinally advancing wire including a wire feed roller which will not rotate in the reverse direction.

Another object of this invention is to provide an apparatus for moving very fine wire longitudinally an infinitely small adjustable distance in a forward direction only, said wire being locked against backward movement.

Another object of this invention is to provide an apparatus which will position a strapping element to any desired axial rotation.

A further object of this invention is to provide for dimpling said strapping element prior to being positioned on a substrate.

The apparatus of the invention for moving very fine wire longitudinally in a forward direction an infinitely small adjustable distance, and for preventing back motion has roller means engaging said wire, said roller being operatively connected with essentially no free play to a drive clutch engageable at any position of rotation. Means are provided for imparting an infinitely small adjustable angular rotation to said drive clutch in the forward direction. A second clutch engageable at any position of rotation is operatively connected with essentially no free play in reverse relationship to said drive clutch for preventing back rotation of said drive clutch.

The said wire moving means is particularly suited for use in a strap forming and positioning apparatus having means for forming said wire about a mandrel to form a strap or straps, and adjustable means for accurately positioning said straps on a substrate at any desired axial position.

The apparatus of this invention solves many of the prevailing problems associated with automating the formation and installation of strapping elements on electronic circuitry elements, or substrates. The advantages of the apparatus disclosed in the copending application above cited together with the improvements and advanced mechanisms of the instant invention provide an apparatus which positions very thin wire over a mandrel without being bent, then forms the generally L-shaped bridging elements from said wire, and then, without releasing the resultant formed strap, positions it on a substrate.

The foregoing and other objects and features and advantages of the invention will be apparent from the following more particular descriptions of preferred embodiments of the invention as illustrated in the accompanying drawings.

DESCRIPTION OF THE PREFERRED EMBODIMENT

Referring now to the drawings, a preferred specific embodiment of the wire moving and positioning apparatus of the invention will first be described. This description will be followed by a description of a strap forming and positioning apparatus in which the wire moving and positioning means is particularly suited for use.

Clockwise rotation of roller 116 (as viewed in FIG. 8) will cause wire 120 to unwind from supply spool 176 and advance toward said stop 168. The length of the advance of said wire is a function of the rotation of said roller 116. While the pressure of said roller 116 may be such that said roller may override said wire 120 after said wire abuts against stop 168, said wire may be sufficiently fragile that such overriding will cause said wire to bow or bend. Therefore, it is a principal advantage of the invention that means are provided for very accurately controlling the amount of rotation of the roller 116, as hereinafter described.

Figure 8:
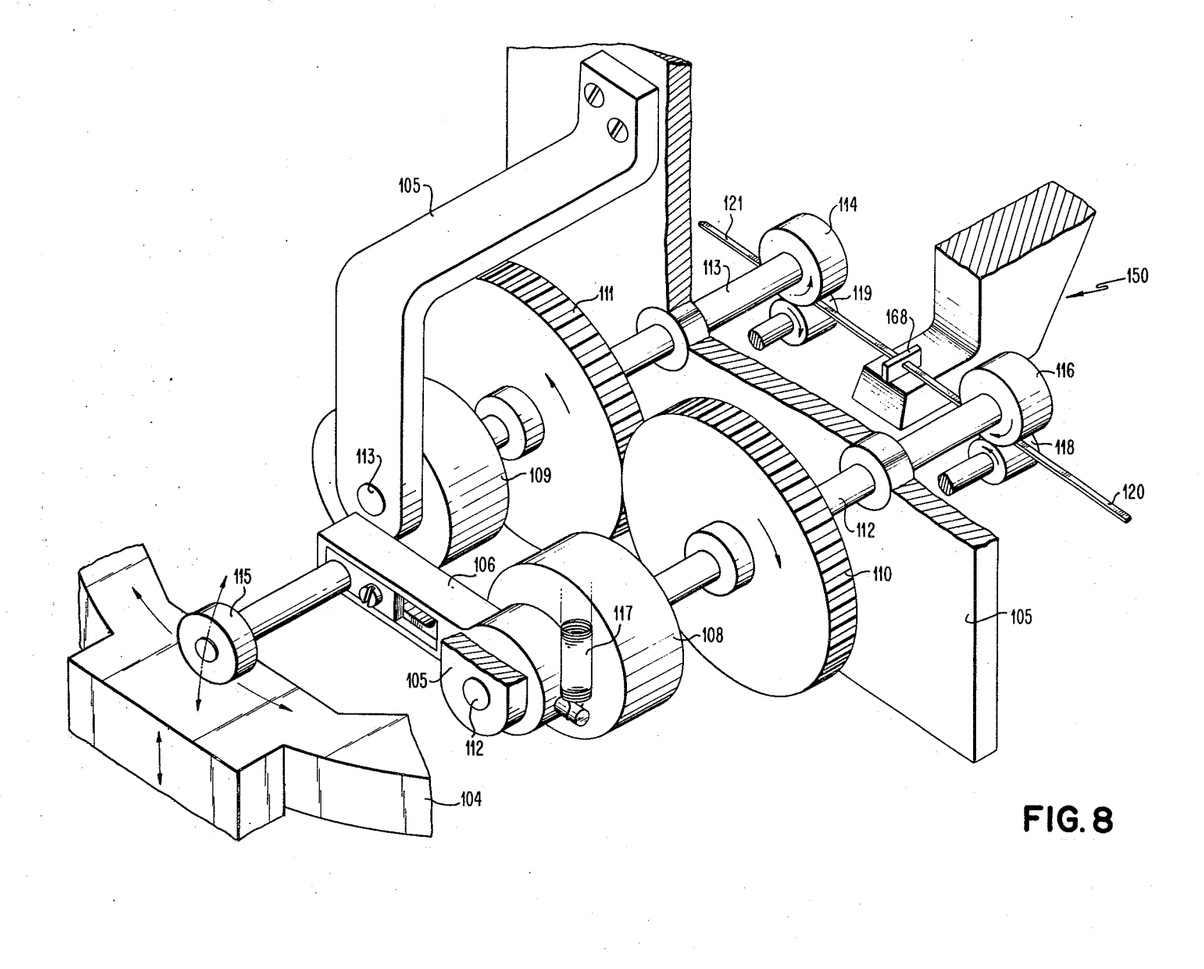
FIG. 8 is a diagrammatic view in perspective in a distorted scale showing a preferred embodiment of the wire feed mechanism of the invention.
Figure 9:
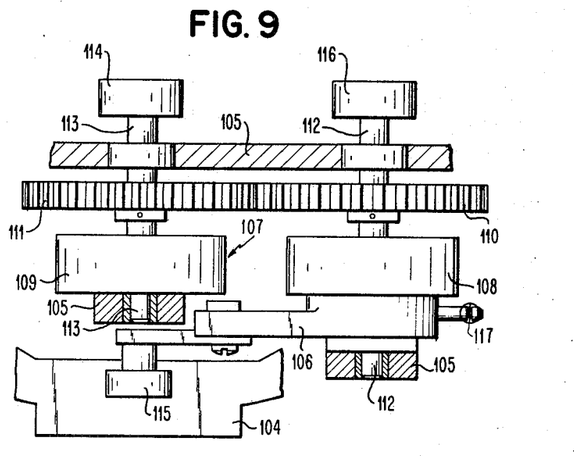
FIG. 9 is a top detail view in partially broken section of the wire feed mechanism.

In order to control the distance that the wire will be fed, infinitely fine adjustment of the amount of rotation of roller 116 is required, inasmuch as the amount of rotation of the roller determines the length of wire fed. This adjustment is done by adjusting the length of feed lever 106. While a constant vertical motion is applied to feed bar 104 during each feed cyclic of wire feed cam 64, the amount of rotation of shaft 112 and roller 116 resulting therefrom is determined by the arc through which feed lever 106 is driven. For a given vertical travel of feed bar 104, the shorter the length of feed lever 106, the greater the rotation imparted to roller 116. Very accurate or infinite adjustment of the distance through which wire 120 is fed is thereby accomplished, essentially eliminating overriding by roller 116 at the end of a feed stroke.

In order to feed two wires simultaneously into both sides of stop 168, similar elements are provided. Fixedly attached to shaft 112 is precision gear 110. Shaft 113 has affixed thereto precision gear 111. Said shafts and gears are so arranged that a given rotation of shaft 12 imparts an equal and opposite rotation to shaft 113. Wire feed wheel 114 is fixedly attached to shaft 113, and frictionally engages wire 121 for advancing said wire. For the purpose of imparting said rotation to shaft 113 and roller 114, and also for the prevention of backlash described hereafter, it is required that there be essentially no free play between gears 110 and 111. Note also, that if both of said wires 119 and 120 are not to be fed an equal distance, the gear ratio between precision gears 110 and 111 need merely be changed.

The cam and roller clutches 108 and 109 are provided for preventing backlash. Backlash would occur where wire 120 driven backwards, away from stop 168, as feed lever 106 is reset to its start position for the next feed cycle. Cam and roller clutch 108 is mounted on shaft 112, and is fixedly attached to feed lever 106. During the feed stroke of lever 106, as feed bar 104 is driven upwards by feed cam 64, cam and roller clutch 108 locks on shaft 112 causing said shaft to rotate clockwise as viewed in FIG. 8. Spring 117 is attached between cam and roller clutch 108 and feed mounting 105, and urges lever 106 against feed bar 104. As said bar 104 drops, lever 106 rotates counterclockwise thereby rotating cam and roller clutch 108 in the same direction. However, during counterclockwise rotation of clutch 108, said clutch freewheels on shaft 112.

To lock shaft 112 against reverse rotation as clutch 108 rotates counterclockwise, cam and roller clutch 109 is mounted in reverse relationship to clutch 108. Clutch 109 is fixedly attached to mounting 105, and mounted on shaft 113. During the feed stroke, shaft 113 rotates counterclockwise, and clutch 109 freewheels. However, clutch 109 locks on shaft 113 to prevent clockwise rotation of said shaft 109, and also, through gears 110 and 111, prevents counterclockwise rotation of shaft 12.

While the preferred embodiment shows stationary housing 109 and cam and roller clutch 107 mounted on shaft 113, as will be appreciated by those skilled in the art, said housing 109 and clutch 107 could be mounted on shaft 112—there being fixed driving relationship maintained between shafts 112 and 113 by precision gears 110 and 111. If this is done, shaft 113 may be eliminated entirely when wire is to be fed against stop 168 by roller 116 only.

It is essential for proper operation of the invention that drive clutch 108 be engageable at any position of rotation, and that second clutch 109 also be engageable at any position of rotation. This feature, of course, enables the amount that the wire is moved to be adjusted to essentially any amount and also means that all back motion can be prevented. The ratchet and pawl drive disclosed in copending application Ser. No. 589,645, filed Oct. 26, 1966, while a form of clutch, is engageable only at intervals measured by the size of the teeth on the ratchet and is, for that reason, not acceptable for use in this invention.

Figure 10:
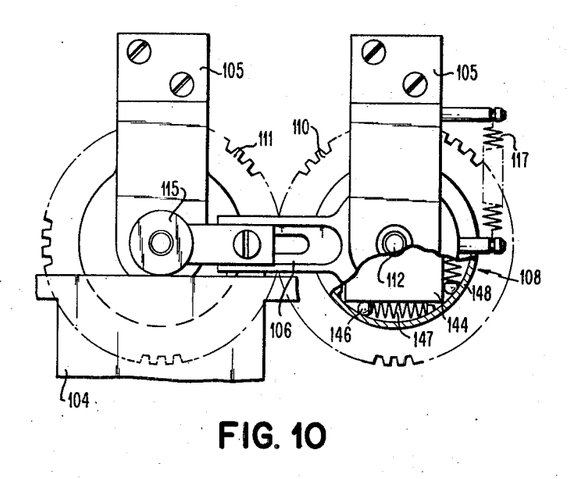
FIG. 10 is a front detail view in partially broken section of the wire feed mechanism.

A form of clutch which is engageable at any position of rotation, and which is particularly suited for use in the wire feed apparatus of the invention is the cam and roller clutch 108. Referring to FIG. 10, cam and roller drive clutch 108 is shown in partially broken section. The inner driving member 144 has camming surfaces at its outer rim and carries light springs 147 that force rollers 146 to wedge between these surfaces (of cam 144) and the inner cylindrical face 148 of the driven member. Inner driving member 144 is rotated by feed arm 106, while driven member 148 drives shaft 112. In the forward, or driving direction, springs 147 cause roller 146 to tightly wedge between members 144 and 148 to give essentially a positive driving relationship between feed lever 106 and feed shaft 112 through clutch 108. When cam 144 is driven by feed lever 106 in the backwards direction, as when said feed lever 106 is returning for a next feed stroke, friction will force the rollers 146 out of tight wedging position and break the connection between members 144 and 148.

Thus, a positive driving relationship, engageable at any position of rotation, is maintained between feed lever 106 and feed shaft 112 in the forward direction by cam and roller clutch 108. And, said positive relationship is disengageable at any position of rotation when feed lever 106 is rotated in a backward direction.

While the cam and roller clutch is described in this preferred embodiment of the invention, it is to be understood that any clutch type which is engageable at any position of rotation may be used. Other basic types of mechanical clutches which may be made operable include, overriding clutches which are instant engaging (that is, without ratchet and pawl), such as those described by A. DeFeo, Construction Details of Over-Riding Clutches, at pages 80 and 81 of Product Engineering Design Magazine, edited by Douglas C. Greenwood, Library of Congress #59-13681, McGraw-Hill, New York, N.Y., 1959.

GENERAL DESCRIPTION OF THE ASSEMBLY PROCESS AND PRODUCT

The wire feed apparatus of the invention heretofore described is particularly suited for use in a strap forming and positioning apparatus used in the automatic assembly of electronic devices. Following a brief description of the assembly process, the strap former will be described which incorporates the wire feed apparatus of the invention.

Figures 1, 2, 3:
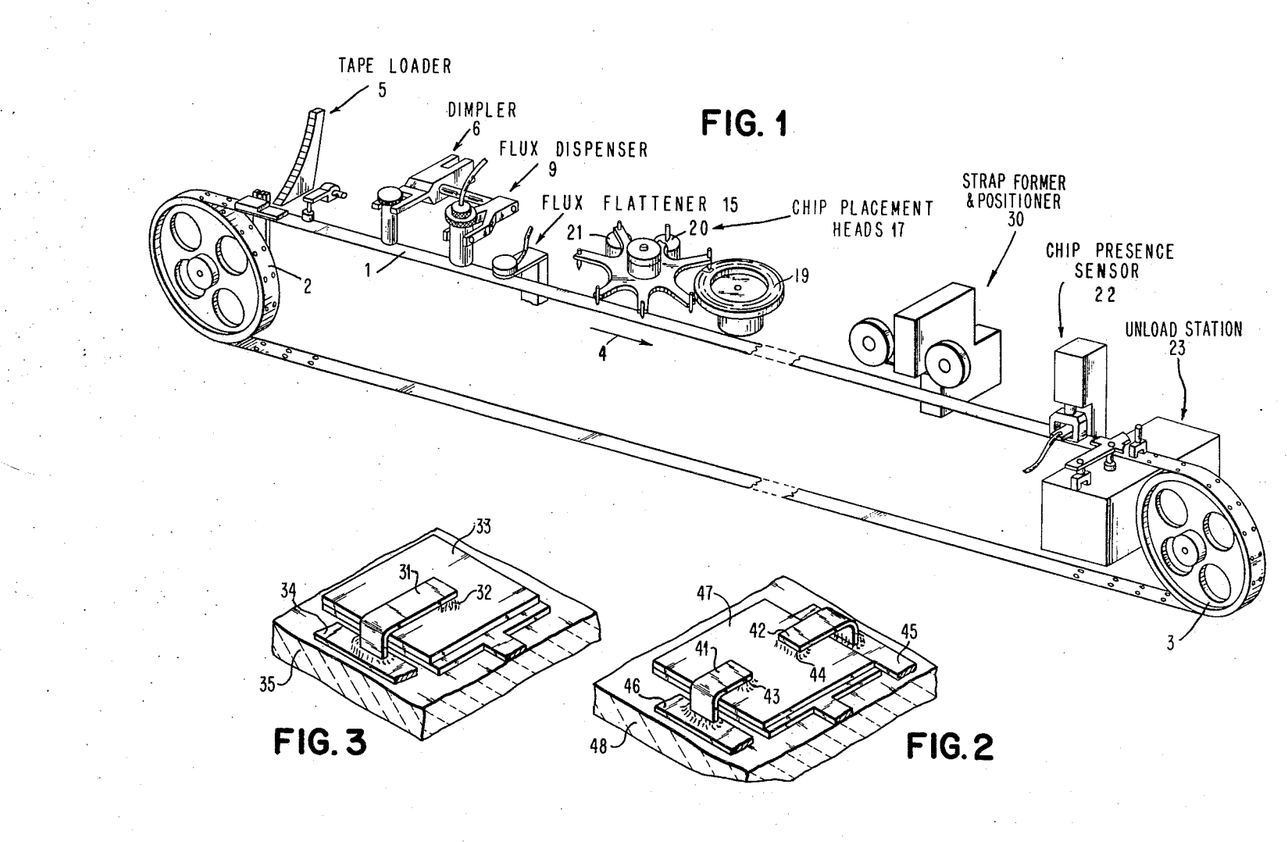
FIG. 1 is a diagrammatic view in perspective illustrating an overall automatic apparatus for positioning semiconductor chips and bridging or strapping elements on substrates.
FIG. 2 is a fragmentary perspective view in broken section in greatly enlarged scale illustrating a typical arrangement of a pair of L-strap elements in a microminiaturized hybrid circuit module.
FIG. 3 is a fragmentary perspective view in broken section in greatly enlarged scale showing a single strapping element mounted on a miniature hybrid circuit module.

Referring further to FIG. 1 the successive operating stations of the automated device assembly apparatus are shown schematically. A series of substrates are carried in sequence from one station to the next by a metal conveyor tape 1 entrained about a pair of pulleys 2 and 3 so that the upper run of tape 1 moves in the direction from left to right as viewed in the drawing. Tape loader 5 constitutes the first station and loads the substrates onto tape 1.

At the next station a dimpler 6 is provided having an array of coining punches to dimple a flat area on each of the pads of the substrate which will subsequently receive the terminals of chips or the ends of the L-shaped strapping elements produced and positioned by the apparatus 30 of the instant invention.

The next station is a flux dispenser 9 wherein droplets of flux are discharged onto the substrate area in the approximate locations preparatory to affixing the chips or strap elements to the substrate.

To reduce the flux droplet height a flux flattener, generally indicated at 15, emits a jet of compressed air against each of the flux droplets to flatten and spread same on the substrate.

At the next station is a rotary semiconductor chip placement head indicated generally as 17. The number of chip placement heads provided will correspond to the number of chips to be positioned upon each of the substrates since each head 17 positions a chip at a particular location on a printed circuit pattern.

The next station is an additional flux station (not shown) which places flux on top of the device balls for the strap connection.

The substrates are then conveyed by the tape conveyor 1 to a strapping element forming and positioning apparatus 30 which will be described in detail. One or more bridge or strap element forming and positioning apparatus can be provided depending on the number of bridges or straps to be installed on the substrate.

After the substrates are carried by the tape conveyor 1 from the forming and positioning apparatus 30, the next operating station in sequence is a chip and bridge element presence sensor 22. This device tests each substrate to determine if the required number of chips and bridging elements has been positioned thereon. Each substrate is thereby characterized by an accept or reject and this characterization is retained in the memory circuitry of the electrical control system until the substrate is carried by conveyor 1 to unload station 23.

FIG. 2 depicts in greatly enlarged scale two strapping elements 41 and 42. Said strapping elements interconnect ball terminal 43 and land 46, and ball terminal 44 and land 45 respectively. As will be seen hereinafter, the dimension separating strap 41 from strap 42 is equal to the width of the stop 168 depicted in FIG. 6.

In FIG. 3 is illustrated in greatly enlarged scale a single bridging element 31 interconnecting ball terminal 32 and land 34. Ball terminal 32 is mounted upon chip or device 33, and chip 33 and land 34 are mounted upon substrate 35. The bridging or strapping element 31 can be made of any suitable conductive material in any suitable form. The material can be a wire, or a ribbon as shown in FIG. 2.

The substrates 35 are precisely positioned at each of the stations in the aforementioned apparatus with a clamp mechanism (not shown).

While not shown, the orientation of strapping elements 31, or 41 and 42, may be at any desired angular relationship with respect to substrate 35 or 48 respectively.

GENERAL DESCRIPTION OF THE STRAP FORMER

Figure 7:
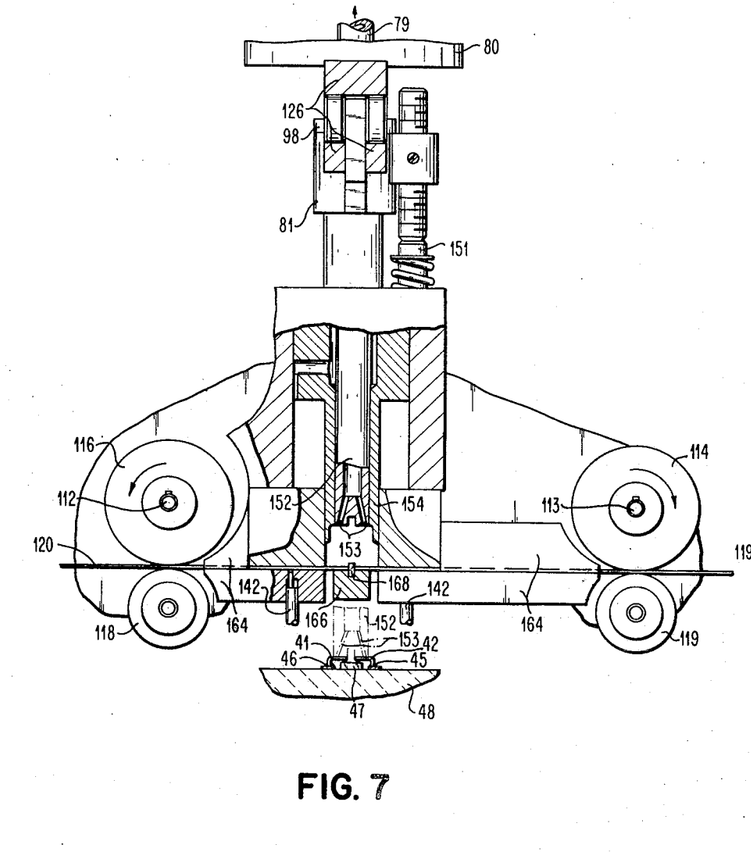
FIG. 7 is a detailed view in partially broken section taken on line AA of FIG. 4, and showing the mandrel, vacuum probe, and forming tool in various stages of the operation.

In general, referring to FIG. 7, the strap former and positioner is an apparatus for forming an L-shaped strap 41 from wire stock 120, and then positioning said strap on device substrate 48.

The wire stock 120 is fed over mandrel 166, sheared and formed into an L-shaped strap over said mandrel, removed from said mandrel 166 and positioned on the substrate 48. In positioning the strap on the substrate, it is necessary to move it through a vertical distance. The means provided for adjusting the vertical position of the strap when it is released on the device substrate will first be described.

Figure 4:
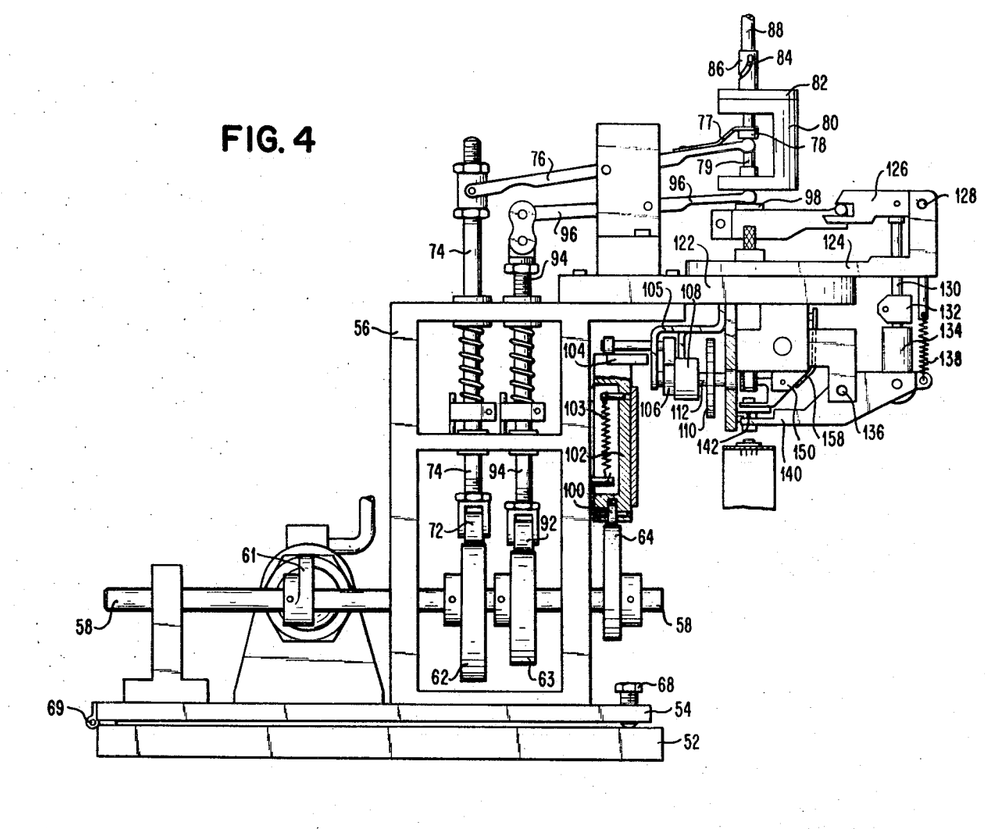
FIG. 4 is a side elevation view in partially broken section showing a preferred specific embodiment of the strapping element forming and positioning apparatus in which the wire moving means of the invention is particularly suited for use.
Figure 5:
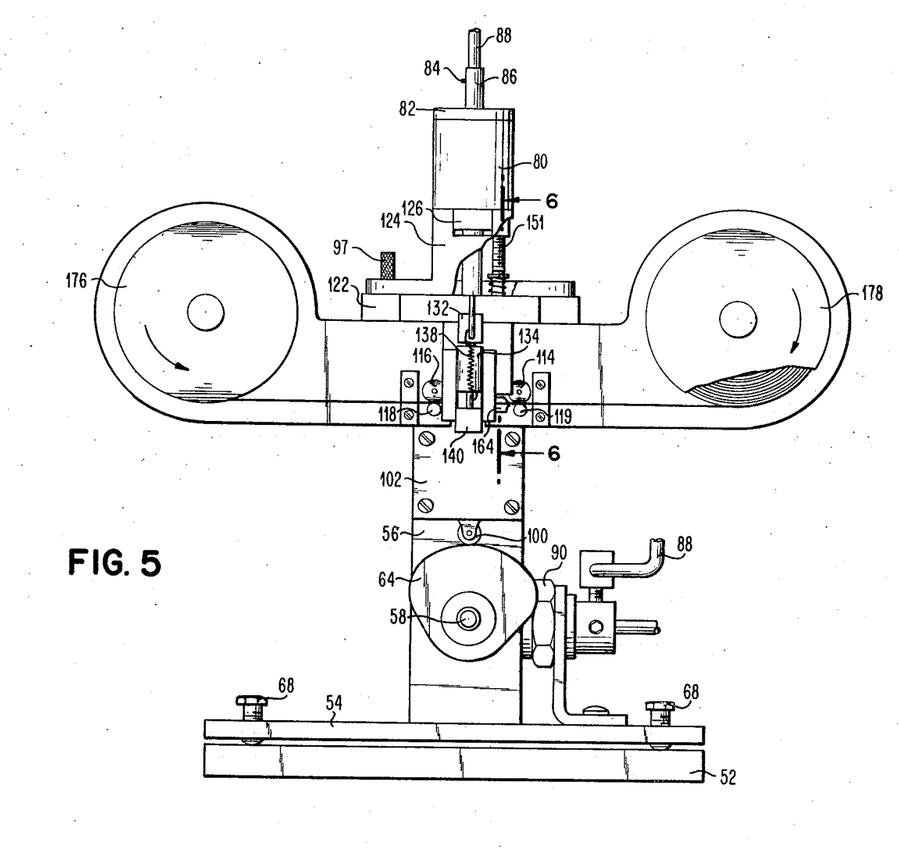
FIG. 5 is a front elevation view in partially broken section of the preferred specific embodiment of the strap element forming and bridging positioning apparatus of the invention.

As shown in FIGS. 4 and 5, the strap former has a base plate 52. Mounted upon base plate 52 is base frame 54, base frame 54 may be pivoted with respect to base plate pivot 69 by adjusting screw 68, enabling the apparatus 30 to be adjusted in the vertical plane. This mounting enables the forming and positioning apparatus 30 to be positioned so that the bridging elements 41, 42 can be presented to the substrate from the proper vertical height. While an angle away from the vertical of vacuum probe 152 is obtained by adjusting about pivot 69, the angle is so small that it can be disregarded. Mounted upon base frame 54 is upright support 56, having cam shaft 58. Mounted upon cam shaft 58 and fixedly attached thereto are counter cam 60, vacuum shut off cam 61, probe cam 62, punch cam 63, and wire feed cam 64.

In forming and positioning the straps on the device substrate, vacuum probe 152 (driven by transfer element 79) holds the wire or strap securely by vacuum force and form tool 154 (driven by form tool arm 81) forms the strap element from wire stock. Means are provided for controlling the movement and operation of transfer element 79, and form tool arm 81 will next be described.

Cooperating with probe cam 62 is cam follower 72 which moves push rod 74, thereby actuating rocker arm 76. Attached to rocker arm 76 is leaf spring 77. Rocker arm 76 and leaf spring 77 cooperate to engage radial flange 78 which is fixedly mounted or attached to transfer element 79. Thus, rotation of rocker arm 76 causes transfer element 79 to move vertically up or down with respect to form tool 80.

Attached to the top of transfer element 79 is flexible tube 88. The other end of tube 88 is attached to vacuum valve 90. Vacuum valve 90 is actuated by vacuum shut off cam 61. Thus, the presence or absence of a vacuum in transfer element 79 and, thereby, in vacuum probe 152 is controlled by the timing of vacuum shut off cam 61. Application of a vacuum to vacuum probe 152 results in retaining a strap element on the end thereof, whereas application of air under pressure results in the ejection of said element.

Vertical movement of forming punch 98 is under control of rocker arm 96. Said rocker arm 96 is pivoted in accordance with movement of push rod 94 cooperating with cam follower 92 on punch cam 63.

DESCRIPTION OF THE STRAP FORMER AND POSITIONER

Figure 6:
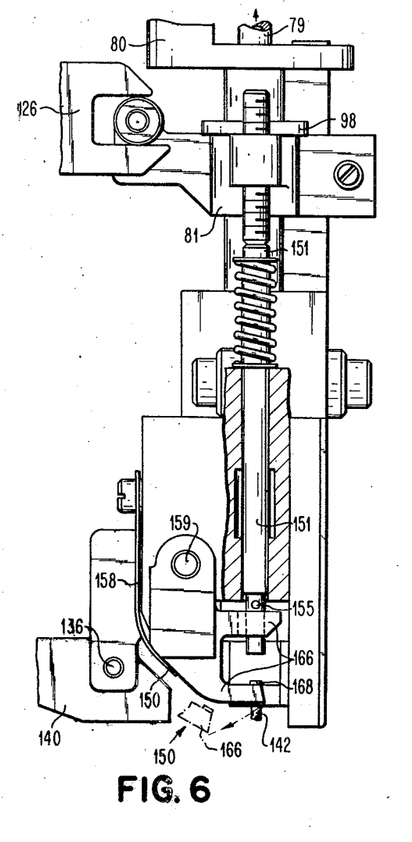
FIG. 6 is a detailed view in partially broken section of the bridge head.

Referring now to FIGS. 6 and 7, the vacuum probe 152 and forming tool 154 will next be described. Wire or strap material is fed from wire supply spools 176 and 178 through wire feed rolls 116 and 118, and 114 and 119 respectively. Said strapping material passes through die set 164 and abuts against stop 168. Vacuum probe 152 having vacuum passages 153, slides within forming tool 154. Forming tool 154 slides within bushing 156. As described above, the vertical motion of vacuum probe 152 is controlled by rocker arm 76, while vertical motion of forming tool tip 154 is controlled by rocker arm 96. Die set 164 also contains passageways for dimpler punches 142. Stop 168 is held in anvil 166, which anvil may be retracted away from the position shown in order to allow passage of the vacuum probe 152 to carry the formed L-straps 41 and 42 to position them on the substrates 48.

Referring now to FIG. 6 the bridge head 150 used in forming the strap element from wire stock will be described in greater detail. Anvil 166 carrying stop 168 is urged into the position shown by probe spring 158. After the strap has been formed, anvil 166 is pushed by shaft 151 out of the path of vacuum probe 152 by rotation about probe pivot 159. As push shaft 151 is carried down by form tool arm 81, push pin 155 engages anvil 166 to effect the above noted rotation about pivot 159. After anvil 166 has been removed, the way is clear for vacuum probe 152 to carry the straps 41, 42 down to the device substrate.

DESCRIPTION OF THE DIMPLING MEANS

The dimpler mechanism will next be explained. Referring to FIG. 3 the dimpling operation forms a socket in the strap material 31, for example, into which the ball 32 fits, thus providing a more sure mounting and positioning of said strap 31 to the substrate. Referring to FIG. 4, attached to upright support 56 is clamp 122 having mounted thereon dimpler base 124. Attached to dimpler base pivot pin 128 and cooperating with form tool arm 81 is dimpler pivot arm 126. Form tool arm 81 is fixedly attached to form tool 80 such that motion of rocker arm 96 causes form tool arm 81 to reciprocate in a vertical motion. This movement of form tool arm 81 cooperating with the groove in dimpler pivot arm 126 causes the latter to pivot about pivot pin 128. Attached to dimpler pivot arm 126 is dimpler shaft 130 having mounted thereon adjustable flange 132. Pivot pin 136 is held in fixed relationship to dimpler base 124. Dimpler arm 140 having dimpler punch 142 attached to one end cooperates with dimpler shaft 130 through dimpler collar 134: dimpler collar 134 is fixedly attached to dimpler arm 140 and dimpler shaft 130 freely slides within dimpler collar 134; adjustable flange 132 acts as a stop against the upper surface of dimpler collar 134 when dimpler arm 130 is moved downwards. Dimpler spring 138 urges dimpler arm 140 in a counterclockwise sense, as viewed.

DESCRIPTION OF THE WIRE FEED MEANS

The wire feed means of the invention described above, is particularly suited for use in the strap former and positioner. The wire feed means of the invention is used to feed wire a precisely controlled distance each feed stroke from supply spools 176 and 178 up to stop 168.

As is most clearly shown in FIGS. 4 and 8, the wire feed mechanism is mounted in feed mounting 105. Said mounting 105 is integrally connected with angular adjustment base 124, and is thereby rotatable about the axis of transfer element 79. That element of the wire feed mechanism which is fixedly attached to said mounting 105 is stationary housing 109, while shafts 112 and 113 are rotatably mounted to said housing.

If only one strap 31 is to be formed, as in the embodiment of FIG. 3, the wire supply for either feed roller 114 or 116 may be removed and wire fed just by the other.

Because of the unique advantages of the wire feed apparatus described above, its use in this particular embodiment permits wire 119 and 120 to be precisely positioned just against stop 168 and held against being withdrawn (i.e., due to backlash). Thus, very thin wire may be used in making L-straps that are not bent or otherwise deformed by forces on the wire during the wire feed step.

After the wire is fed up to the stop 168 on anvil 166, the vacuum probe 152 holds the wire in position while forming tool 154 cuts the wire to proper length and forms it into an L-shape about anvil 166.

DESCRIPTION OF THE STRAP ORIENTING MEANS

Figure 11:
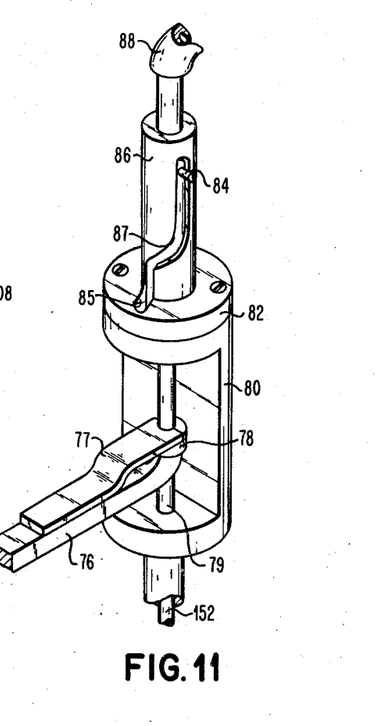
FIG. 11 is a fragmentary perspective view in broken section showing the strap orienting cylinder.

The means provided for orienting the strap at the desired axial angle with respect to substrate flow includes a strap orienting cylinder 86, as depicted in FIG. 11, and the angular adjustment base 124, as depicted in FIG. 4.

Adjustment of base 124 rotates the bridge head 150 and all related mechanisms (including the dimpling means 140 and wire feed means 105) through ±45° about the axis of transfer element 79. Loosening adjustment screw 97 allows base 124 to rotate within clamp 122. Angular adjustment bar 104 does not rotate, but is in the form of a half moon (FIG. 8). Thus, even though wire feed mounting 105 and lever 106 rotate with base 124, a driving relationship is maintained between bar 104 and feed lever 106.

The result obtained by rotating adjustment base 124 is to place the straps 41, 42 on substrate 48 at ±45° with respect to substrate flow on tape conveyor 1. Orientation in excess of ±45° is obtained by changing strap orienting cylinder 86. Whereas adjustment base 124 orients the strap forming head 150 and related mechanisms, the strap orienting cylinder 86 rotates the strap after the forming operation and during its descent from the forming bridge head 150 to the substrate 48 on conveyor 1.

Referring now to FIG. 11, strap orienting cylinder 86 is mounted on top of the form tool 80. In the periphery of said cylinder 86 is generally vertical slot or orienting groove 87. Vacuum probe pin 84 is fixedly attached to transfer element 79 and extends through orienting groove 87. On the down stroke of the transfer element 79 and while the straps are being formed, the orienting groove 87 is vertical. After the forming operation, the transfer element 79 descends to position the strap 41, 42 on substrate 48. During this portion of the stroke, the orienting groove 87 is a helix which will rotate the transfer element 79 to the desired axial rotation. If a different rotation is required, a different strap orienting cylinder 86 is used. This assembly slot 85 in strap orienting cylinder base 82 enables the strap orienting cylinder 86 to be removed while leaving vacuum probe pin 84 attached to transfer element 79. Thus, vertical motion of transfer element 79 is caused by the cooperation of rocker arm 76 and leaf spring 77 with radial flange 78; while angular rotation of transfer element 79 is a result of the cooperation of vacuum probe pin 84 with orienting groove 87 in strap orienting cylinder 86.

It will be noted that the wire feed mechanism of this invention is infinitely small adjustable and that the strap orienting means are adjustable to any angle. These two features, in combination, present a decided advantage over the bridge forming and positioning apparatus of copending application Ser. No. 589,645, filed Oct. 26, 1966.

OPERATION

Figure 12:
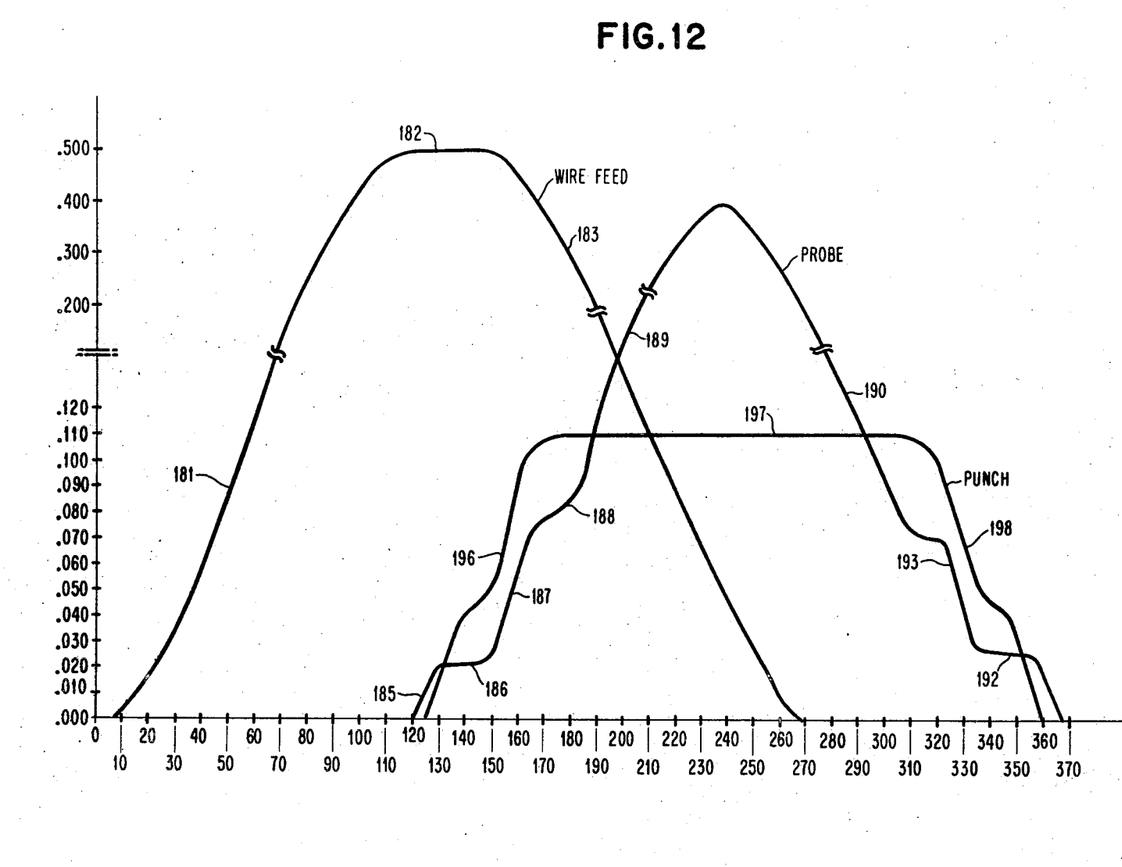
FIG. 12 is a cam excursion and timing chart showing the relative position of the three major timing cam followers: the wire feed, the probe, and the punch cam followers.

Referring to FIG. 12 a cam timing chart is shown showing the relative displacements of the cam followers which cooperate with the wire feed cam 64, the punch cam 63, and the probe cam 62; as a function of a relative angular displacement of the cam shaft 58.

Referring now more particularly to FIG. 7, with reference to FIG. 12, the sequence of operations for forming a pair of L-straps and positioning them on a substrate will be described. During portion 181 of the wire feed cam diagram, wire 120 and 121 is fed by rollers 116 and 114 from wire supply spools 176 and 178 against stop 168 in anvil 166. During portion 185 of the probe cam timing chart, probe 152 travels down to the wire and holds it in place on anvil 166 during dwell portion 186 of the probe cam timing chart. During portion 196 of the punch cam timing chart, forming tool 154 travels downward to cut the wire and form it around anvil 166, thereby forming straps 41 and 42 from wire 120 and 121. During this same portion 196 of the punch cam timing chart, the anvil 168 is swung out of die set 164, and dimple punches 142 are raised to dimple the wire remaining in die set 164. During portions 187, 188, and 189 of probe cam timing chart, the vacuum probe 152 continues down rotating about its axis for strap orienting and places straps 41 and 42 on module 48. At this time, the vacuum in vacuum probe 152 is released and a jet of air through ports 153 disengages straps 41 and 42 from vacuum probe 152. The forming tool 154, the vacuum probe 152 and anvil 166 then return to their original positions.

The apparatus and method of the invention can be modified to meet specific design problems of various operations. For example, one or two L-shaped straps may be formed and positioned. Further, the strap element can be made to span a plurality of lands. Further, the apparatus can be used to form connections between lands and elements mounted on substrates. The wire advance means described can be applied to any application where very thin wire must be positioned against a stop, such as for subsequent forming and positioning operations.

While the invention has been particularly shown and described with reference to the preferred embodiment thereof, it will be understood by those skilled in the art that various changes in form and details may be made therein without departing from the spirit and scope of the invention.

What is claimed is:

1. An apparatus for moving a wire longitudinally a precisely controlled amount and preventing back motion, which comprises:
   a drive clutch engageable at any position of rotation to drive the wire in a given direction,
   means for engaging the wire,
   means operatively connecting the drive clutch and the means for engaging the wire and having essentially no free play,
   a second clutch engageable at any position of rotation and mounted in reverse relationship to the drive clutch for locking the means for engaging the wire against reverse rotation, and
   means operatively connecting the second clutch and the drive clutch and having essentially no free play.

2. The apparatus of claim 1 wherein the clutches are cam-roller clutches.

3. An apparatus as in claim 1, the apparatus being capable of moving a plurality of wires a precisely controlled amount and preventing back motion of the wires, the apparatus additionally comprising:
   additional means for engaging each additional wire, and
   means operatively connecting the drive clutch and each additional means for engaging each additional wire and having essentially no free play.

4. The apparatus of claim 3 wherein the clutches are cam-roller clutches.

5. Wire positioning means for positioning wire against a stop, comprising:
   advancing means engaging said wire;
   drive clutch means engageable at any position of rotation for rotating said advancing means;
   means for adjusting the arc through which said advancing means are rotated;
   means for restoring said drive clutch means for a next advancing cycle; and
   second clutch means engageable at any position of rotation for preventing reverse rotation of said advancing means while said rotating means are restored for a next advancing cycle.

6. Wire advancing means for simultaneously advancing wire from two wire supply spools and positioning said wire against opposite sides of a stop, comprising:
   a first rotatable advancing means mounted on a first shaft;
   a second rotatable advancing means mounted on a second shaft;
   said first advancing means engaging the wire from said first supply spool;
   said second advancing means engaging the wire from said second supply spool;
   gear means interconnecting said shafts and having essentially no free play;
   rotating means for rotating said advancing means so as to drive said wire in a forward direction into said stop;
   drive clutch means engageable at any angular position interposed between said rotating means and said advancing means holding said rotating means in driving relationship to said advancing means in the forward direction and allowing said rotating means to freewheel with respect to said advancing means when said rotating means are restored preparatory to the next advancing cycle; and second clutch means engageable at any angular position mounted on one of said shafts for preventing reverse rotation of said advancing means while said rotating means are being restored.

7. In an apparatus for forming and positioning a strapping element on a substrate having,
a substrate support;
a frame positioning adjacent said substrate support;
a movable transfer element mounted on said frame over said substrate support;
a vacuum means for retaining a strapping element on the end of said transfer element;
a retractable mandrel mounted on said frame;
a shearing and forming punch mounted on said frame for cooperation with said mandrel;
a wire supply means mounted on said frame having means for advancing wire over said mandrel and under said transfer element and forming punch; and
actuating said means for advancing wire, moving said transfer element into abutting and holding engagement with the wire moving said shearing and forming punch to shear a length of wire and subsequently shape same over said mandrel, retract said mandrel, advance said transfer element and position the resulting strapping element on the substrate, and subsequently ejecting the strapping element;
the improvements comprising:
drive clutch means engageable at any position of rotation to drive said wire in a given direction a precisely controlled amount to position said wire over said mandrel;
means for engaging said wire;
means operatively connecting the drive clutch and the engaging means and having essentially no free play;
a second clutch engageable at any position of rotation and mounted in reverse relationship to the drive clutch for locking the means for engaging the wire against reverse rotation;
means operatively connecting the second clutch and the drive clutch and having essentially no free play; and
adjustable means for rotating said transfer element after said wire has been sheared and before said strap is positioned on the device substrate.

8. An apparatus for moving two wires longitudinally a precisely controlled amount, positioning said wire against opposite sides of a stop and preventing back motion of the wires, comprising:
first roller means engaging the first wire and mounted on a first shaft;
second roller means engaging the second wire and mounted on a second shaft;
means operatively interconnecting said first and second shafts having essentially no free play;
drive clutch means engageable at any position of rotation mounted on said first shaft;
adjustable means for rotating said drive clutch in the forward direction through an arc corresponding to the longitudinal distance said wires are to be moved;
means for restoring said rotating means;
second clutch means engageable at any position of rotation mounted on one of said shafts in reverse relationship to said drive clutch for preventing reverse rotation of said shafts.

References Cited

UNITED STATES PATENTS

| | | | |
|---|---|---|---|
| 3,004,581 | 10/1961 | Krol et al. | |
| 3,264,860 | 8/1966 | Herb | 29—203 |
| 3,267,556 | 8/1966 | Scharf | 29—203 |

THOMAS H. EAGER, Primary Examiner

U.S. Cl. X.R.

29—208; 228—6